J. M. BONDURANT.
FEEDING ATTACHMENT FOR BALING PRESSES.
APPLICATION FILED APR. 1, 1916.
1,216,407.  Patented Feb. 20, 1917.
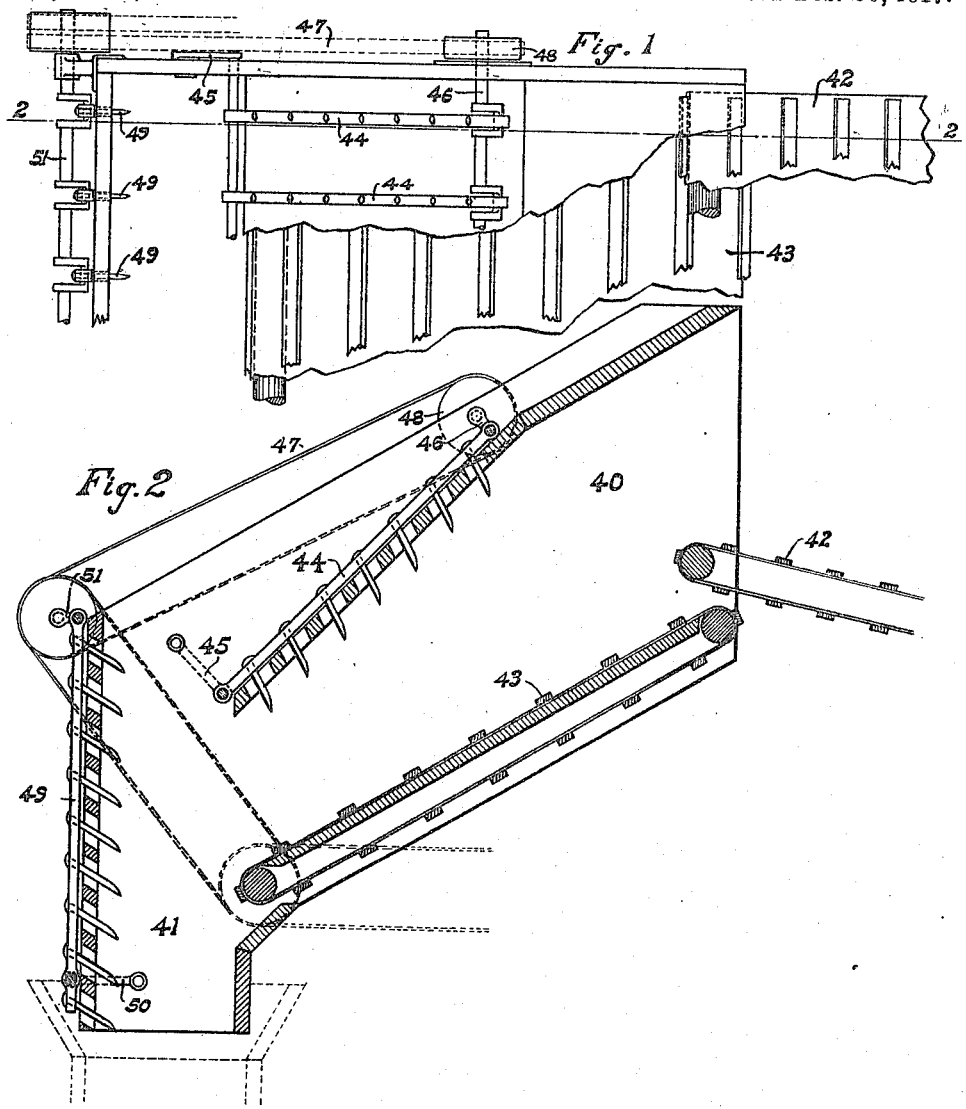

UNITED STATES PATENT OFFICE.

JESSE M. BONDURANT, OF FIGSBORO, VIRGINIA.

FEEDING ATTACHMENT FOR BALING-PRESSES.

1,216,407.      Specification of Letters Patent.    Patented Feb. 20, 1917.

Original application filed August 14, 1915, Serial No. 45,605. Divided and this application filed April 1, 1916. Serial No. 88,319.

*To all whom it may concern:*

Be it known that I, JESSE M. BONDURANT, a citizen of the United States, residing at Figsboro, in the county of Henry and State of Virginia, have invented certain new and useful Improvements in Feeding Attachments for Baling-Presses, of which the following is a specification.

This invention pertains to feeding attachments for baling presses and is a division of my previous application for United States Letters Patent on improvements in baling presses, Serial No. 45,605, filed August 14, 1915, the same having been passed to issue on the 5th day of May, 1916.

The object of the invention embraced in the present application is to provide an improved form of feeding attachment whereby the material to be baled may be fed directly and without the aid of an attendant into the hopper of the baler, and to provide in combination therewith a baling press with which the same may be used. The invention consists in the combination and arrangement of the various elements as herein described and as particularly claimed.

In the drawings, Figure 1 is a broken plan view of an embodiment of my invention, and Fig. 2 a vertical, sectional view of the same taken approximately on the line 2—2 of Fig. 1.

Referring to these drawings, it will be seen that the entire feeding mechanism is mounted over the hopper of a baler and consists of an inclined receiving leg 40 and a vertical delivery leg 41. The receiving leg is formed so as to admit the outer end of the drag 42 of a thresher and is in itself supplied with a suitable drag 43 extending across the bottom of this leg and traversing the same longitudinally thereof. Along the top of this receiving leg is a series of longitudinally-disposed rakes 44, the same being swung at one end on links 45 and being journaled at their other ends on a crank 46. When the crank shaft and crank 46 is rotated by means of the belt 47 and pulley 48, it will be seen that the rakes will be given a reciprocating-vibratory movement and the straw from the drag 42 will be propelled down this leg between the continuously-moving drag 43 and the rakes 44, and it is delivered into the vertical leg 41.

This leg 41 is supplied with a similar series of rakes 49 which have motion identical with that just described for the rakes 44, but no drag is used with this vertical leg, as the weight of the straw will tend to carry it downward into the hopper of the baler. The rakes 49 are hung on links 50 and are actuated by the crank 51. The stiles of both the rakes 44 and 49 are disposed without the respective legs and the teeth thereof extend through suitable slots in the casing of the legs, so that these stiles will not interfere with the progress of the material to be baled. The self-feeder so described is designed particularly for use with balers of the reciprocating plunger type, and when used in connection with balers having an automatic brake applied thereto, such for example as described in the parent application hereof, may be connected directly to the thresher outfit and the entire mechanism driven from one power unit of a suitable capacity.

It will be seen that the various moving parts of the device are suitably belted together from a common source and the entire mechanism forms a simple and economical feeder which may be applied to existing balers.

Having thus described my invention, what I claim is:

In combination with a power-driven baling press, a feeder having an inclined receiving leg and a vertical delivery leg, a drag along the bottom of the said receiving leg having continuous movement longitudinally thereof, a series of rakes disposed longitudinally of the said receiving leg along the top thereof, the said rakes having a reciprocating and vibratory movement longitudinally of the said leg, a series of vertically-disposed rakes along the rear of the said delivery leg, said rakes having reciprocating and vibratory movement longitudinally of the said leg and means for actuating the said drag and the said rakes from the power of the said baling press.

In testimony whereof, I affix my signature in presence of two witnesses.

JESSE M. BONDURANT.

Witnesses:
Roy F. Dowdy,
A. K. Simmons.

Copies of this patent may be obtained for five cents each, by addressing the "Commissioner of Patents, Washington, D. C."